Feb. 16, 1926.

E. KOERNER

CIGARETTE MAKING MACHINE

Filed August 3, 1925

1,573,616

Inventor:
Ewald Koerner

Patented Feb. 16, 1926.

1,573,616

UNITED STATES PATENT OFFICE.

EWALD KOERNER, OF DRESDEN, GERMANY.

CIGARETTE-MAKING MACHINE.

Application filed August 3, 1925. Serial No. 47,842.

*To all whom it may concern:*

Be it known that I, EWALD KOERNER, a citizen of the German Republic, residing at Dresden, Germany, have invented certain new and useful Improvements in Cigarette-Making Machines, of which the following is a specification.

This invention relates to a cigarette-making machine of the kind producing a continuous cigarette rod which is divided into cigarette lengths by cutters adapted, in cutting, to follow the movement of the rod.

Either circular or fly cutters are employed in these machines. The circular cutter must, for cutting the rod, be reciprocated transversely to the latter as well as longitudinally of the same, an arrangement which involves a complicated driving mechanism. The fly cutter is provided with an eccentric cutting edge and need not therefore be reciprocated in the transverse direction. It can be made thinner so as to produce a better cut than the circular cutter, but its sharpening is very much more complicated than that of the circular cutter which only requires a grinding tool to be held by hand against its edge. The object of the present invention is to provide means whereby the fly cutter may conveniently be sharpened, and the invention consists in mounting a grinding tool in the machine together with guide elements which hold the tool in uniform contact with all parts of the eccentric cutting edge.

Figure 1:
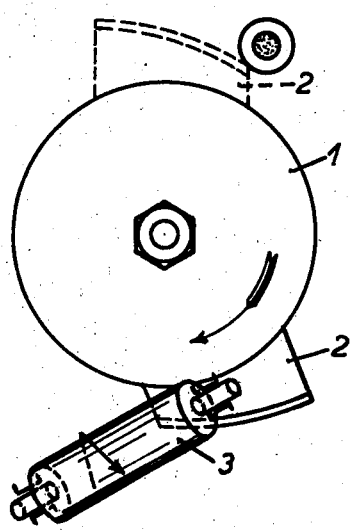
Figure 2:
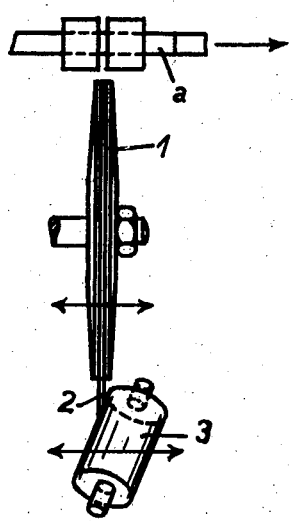

Fig. 1 of the accompanying drawings represents a diagrammatic side view of the fly cutter and its grinding tool, and Fig. 2 is a view at right angles to Fig. 1.

Figure 3:
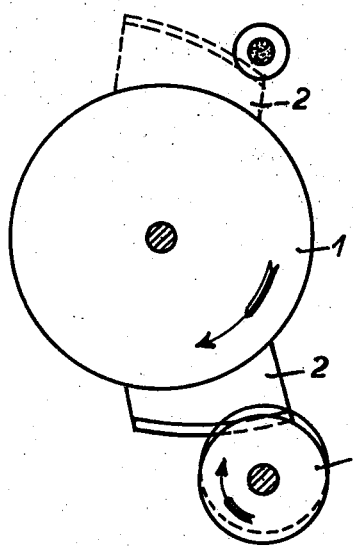
Figure 4:
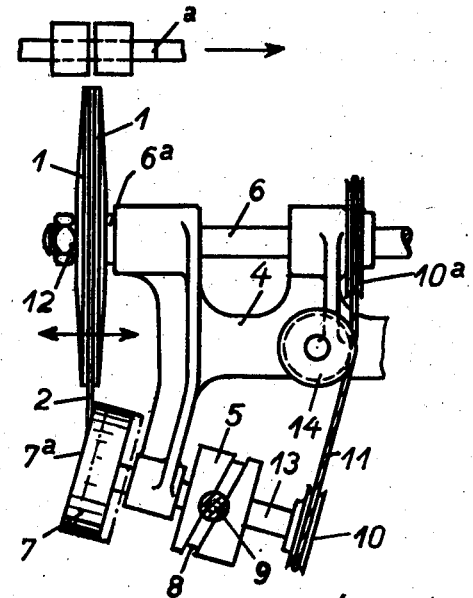

Fig. 3 is another side view of the cutter showing a grinding tool of different shape, and Fig. 4 is a view at right angles to Fig. 3 showing the mechanism whereby the grinding tool is controlled.

The fly cutter is composed of a thin steel plate 2 which is arranged between two supporting discs 1 and clamped together with the latter between a nut 12 and a shoulder 6ª on a driving shaft 6 (Fig. 4). The blade 2 projects from the circumference of the discs and is formed with an eccentric cutting edge which is passed with a dragging motion across the cigarette *a*, as is clear from the diagrams.

To keep the cutter sharp, a grinding tool is arranged in the machine so that it can be brought into contact with the cutting edge. This tool may either consist of a cylindrical roller 3 arranged, as shown in Figs. 1 and 2, so that its circumference is swept by the cutting edge, or it may consist of a flat roller 7 (Figs. 3 and 4) arranged with its flank against the cutter. In each case means must be provided for maintaining constant relationship between the tool and the edge as the contact points of the latter gradually recede from the centre of motion.

The preferred form of device for this purpose is illustrated in Fig. 4 in connection with the grinding roller 7. The bracket 4 which holds the cutter shaft 6, has an additional arm in which it holds the grinding shaft 13. The latter is arranged in an oblique position relative to the cutter shaft so that the flank 7ª of the grinding roller is parallel with the bevel of the cutting edge. Means are provided for reciprocating the shaft 13 so that the grinding roller can change its position as the edge advances and be applied uniformly to all portions of the edge. For this purpose a disc 5 is secured to the shaft 13 and formed with a cam groove 8 which is in engagement with a roller 9 held by a stationary pivot. The shaft 13 is rotated and receives its motion from the cutter shaft through the medium of pulleys 10 and 10ª and a belt 11 which is guided over deflection pulleys 14. The cam groove 8 and the roller 9 bring about the required reciprocation of the grinding shaft when the latter is rotated.

I claim:—

1. In a cigarette-making machine, the combination with a revolving fly cutter having an eccentric cutting edge, of a grinding tool arranged so as to contact with said cutting edge, and means for maintaining constant relationship between the grinding surface and all parts of the eccentric cutting edge.

2. In a cigarette-making machine, the combination with a revolving fly cutter having an eccentric cutting edge, of a grinding tool arranged so as to contact with said cutting edge, a carrier for said tool and means for controlling said carrier so as to maintain constant relationship between the grinding surface and all parts of the eccentric cutting edge.

3. In a cigarette-making machine, the combination with a fly cutter secured to a rotatable shaft and provided with an eccentric cutting edge, of a grinding roller, a shaft arranged in an oblique position relative to the cutter shaft and holding said roller so that it can be swept by the edge of the cutter, means for communicating rotation from one shaft to the other, a cam secured to the grinding shaft, and a stationary element engaging said cam so as to cause the rotating grinding shaft to be reciprocated in an axial direction and maintain uniform engagement between the grinding roller and all parts of the eccentric cutting edge.

EWALD KOERNER.